(12) United States Patent
Yamaguchi et al.

(10) Patent No.: US 7,673,938 B2
(45) Date of Patent: Mar. 9, 2010

(54) VEHICLE SEAT

(75) Inventors: Hiroyoshi Yamaguchi, Yokohama (JP); Makoto Hasegawa, Yokohama (JP); Masato Ohchi, Toyota (JP); Masaharu Tanino, Toyota (JP); Shinji Suzuki, Aichi-ken (JP)

(73) Assignees: NHK Spring Co., Ltd., Yokohama-shi, Kanagawa (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 11/822,665

(22) Filed: Jul. 9, 2007

(65) Prior Publication Data

US 2008/0012381 A1 Jan. 17, 2008

(30) Foreign Application Priority Data

Jul. 10, 2006 (JP) ............................. 2006-189467

(51) Int. Cl.
*B60N 2/42* (2006.01)
(52) U.S. Cl. .................. 297/216.12; 297/409; 297/408; 297/410
(58) Field of Classification Search ............ 297/216.12, 297/409, 408, 410
See application file for complete search history.

(56) References Cited

U.S. PATENT DOCUMENTS

| | | | |
|---|---|---|---|
| 6,474,733 B1 | 11/2002 | Heilig et al. | |
| 6,749,256 B1 * | 6/2004 | Klier et al. | ............. 297/216.12 |
| 7,077,472 B2 * | 7/2006 | Steffens, Jr. | ............ 297/216.13 |
| 7,118,174 B2 * | 10/2006 | Lee | ....................... 297/216.12 |
| 7,134,717 B2 * | 11/2006 | Thunnissen et al. | ..... 297/216.12 |
| 7,234,769 B2 * | 6/2007 | Takenaka et al. | ........ 297/216.12 |

FOREIGN PATENT DOCUMENTS

| | | |
|---|---|---|
| DE | 10030549 A1 | 1/2002 |
| DE | 10232017 C1 | 9/2003 |

(Continued)

OTHER PUBLICATIONS

Japanese Office Action dated May 20, 2008.

(Continued)

*Primary Examiner*—Laurie K Cranmer
(74) *Attorney, Agent, or Firm*—Finnegan, Henderson, Farabow, Garrett & Dunner, LLP

(57) ABSTRACT

A vehicle seat includes a seat body having a seat back, a pair of left and right legs, a headrest coupled to the seat back at above the seat back through the pair of legs, load detecting means provided on the seat back and having a movable part that displaces in a predetermined direction upon undergoing a load from the front of the seat back; a first interacting member mechanically coupled to one leg of the pair and to the movable part of the load detecting means, to move one leg of the pair in conjunction with a displacement of the movable part caused upon undergoing the load, thereby displacing the headrest frontward, and a second interacting member mechanically coupled to the other leg of the pair and to the first interacting member, to move the other leg of the pair in conjunction with a movement of the first interacting member caused upon moving the one leg of the pair, thereby displacing the headrest frontward.

20 Claims, 13 Drawing Sheets

FOREIGN PATENT DOCUMENTS

| | | |
|---|---|---|
| DE | 20122155 U1 | 6/2004 |
| JP | 2-44537 | 3/1990 |
| JP | 2005-66091 | 3/2005 |
| JP | 2005-212596 | 8/2005 |
| JP | 2005/212596 | 8/2005 |
| JP | 2006-82772 | 3/2006 |

OTHER PUBLICATIONS

European Patent Office, Extended Search Report, Dec. 18, 2008, 6 pages.

* cited by examiner

VEHICLE SEAT

CROSS-REFERENCE TO RELATED APPLICATION

This application claims priority under 35 USC 119 from Japanese Patent application No. 2006-189467, the disclosure of which is incorporated by reference herein.

BACKGROUND OF THE PRESENT INVENTION

1. Field of the Present Invention

The present invention relates to a vehicle seat to be mounted on a vehicle.

2. Description of the Related Art

For example, JP-A-2005-212596 discloses an example of so-called an "active headrest" arranged such that, in the event of a collision of a vehicle from behind, the headrest is moved toward the front of the vehicle in order to narrow the spacing between the passenger's head and the headrest.

In the active headrest described in this publication, a lumbar support mechanism is supported rotatably about the axis extending left and right inside of the seat back wherein the lumbar support mechanism is urged toward the front by means of a spring. When the passenger is suddenly moved rearward of the vehicle by the inertia as caused upon being involved in a collision from behind, a load is applied to the seat back. The load causes the lumbar support mechanism to rotate toward the rear against the urging force form spring. This causes a pair of pulleys, over which stretched is a wire having one end coupled to the lumbar support, to move away from each other.

By moving the pair of pulleys away from each other, the other end of the wire is pulled vigorously, and the headrest vertical adjustment mechanism coupled to the other end of the wire is pulled. Thus, since the headrest vertical adjustment mechanism coupled to the wire is drawn, the vertical adjustment mechanism moves toward the rear of the seat. In conjunction therewith, the headrest moves toward the front of the vehicle.

However, when a mechanism of the active headrest constituted so as to pull the headrest vertical adjustment mechanism by the wire is applied to a headrest that is attached on the seat back by a pair of legs, without applying even rotation force through a wire tension to the two legs, it is difficult to rotate the headrest without fail because of entanglement of the movement.

SUMMARY OF THE PRESENT INVENTION

The object of the present invention is to solve the above mentioned problem. A first aspect for accomplishing the above object, a vehicle seat comprises: a seat body having a seat back, a pair of legs, a headrest coupled to the seat back at an upper side of the seat back via the pair of legs; load detecting unit provided on the seat back and having a movable part that displaces in a predetermined direction upon being subjected to a load from the front of the seat back; a first interacting member mechanically coupled to one leg of the pair of legs and to the movable part of the load detecting unit, that moves the one leg of the pair of legs in conjunction with a displacement of the movable part caused upon being subjected to the load and thereby displacing the headrest toward the front; and a second interacting member mechanically coupled to the other leg of the pair of legs and to the first interacting member, that moves the other leg of the pair of legs in conjunction with a movement of the first interacting member caused upon moving the one leg of the pair of legs and thereby displacing the headrest frontward.

In the vehicle seat according to the first aspect, a load is applied in front to the seat back of the seat body. The load, if acts upon the load detecting means, causes the movable part of the load detecting means to displace. The first interacting member operates in conjunction with the displacement of the movable part, to move one of the two legs that are provided underneath the headrest of the seat body so as to displace the headrest toward the front. Meanwhile, the second interacting member, mechanically coupled to the first interacting member, operates in conjunction with a displacement of the headrest through the movement of the pair of legs due to the first interacting member, so as to move the other leg of the pair and displace the headrest toward the front.

Accordingly, in the first aspect of the vehicle seat, both of the two legs are moved by combination movement of the second interacting member with the first interacting member. The pair of legs surely move without entanglement, and thus, displacement of the headrest displaces toward the front is ensured.

A second aspect of the present invention for achieving the above object relates to the vehicle seat of the first aspect wherein the first interacting member has a first gear that is rotated by a movement of the movable part so as to move the one leg of the pair of legs, and the second interacting member having a second gear that is in mesh with the first gear and rotates in conjunction with the rotation of the first gear so as to move the other leg of the pair of legs.

In the second aspect of the vehicle seat, when the movable part of the load detecting means is displaced by the application of a load from front to the seat back of the seat body, the first gear rotates to move one leg of the pair that is coupled to the first gear. Meanwhile, when the first gear rotates, the second gear in mesh therewith rotates to move the other leg of the pair that is coupled to the second gear. Thus, associative rotation of the first and second gears, both legs of the pair move to displace the headrest toward the front.

In the vehicle seat, by setting properly the respective distances between the rotation centers of the first and second gears and the coupling points to the legs, move amount of the legs in accordance with a displacement of the movable part of the load detecting means can be determined freely.

A third aspect of the present invention relates to the vehicle seat of the second aspect further comprising a correction mechanism that absorbs a delay of the movement of the other leg of the pair of legs due to the rotation of the second gear relative behind the movement of the one leg of the pair of legs due to a rotation of the first gear, so that the pair of legs move simultaneously.

In the third aspect of the vehicle seat, one leg of the pair is moved by the rotation of the first gear while the other leg of the pair is moved by the rotation of the second gear in conjunction with the rotation of the first gear. Even when there is a difference in operation timing between the two legs due to mesh backlash at the first and second gears, component dimensional errors etc., the correction structure absorbs the difference in operation timing. Accordingly, the two legs move simultaneously.

A fourth aspect of the present invention relates to the vehicle seat of one of the first to the third aspects further comprising a first guide member that guides the legs at a forward side of the legs with respect to a front-rear direction of the seat body, a second guide member that legs at a rearward side with respect to the front-rear direction and is coupled integrally with the first guide member, and a support including which at least one of the first and second guide members is assembled along the front-rear direction and the first and second interacting members are assembled along the front and rear direction.

In the fourth aspect of the vehicle seat, the first guide member guides the front side of legs in front and rear directions regarding the seat body while the second guide member guides the rear side of the legs in the front and rear directions. The first and second guide members are assembled in the front and rear directions regarding the seat body. Furthermore, at least one of the first and second guide members is assembled to the support along the front and rear directions with respect to the seat body.

As mentioned above, in the vehicle seat, the first and second interacting members are assembled to the support along the front and rear directions regarding the seat body. Accordingly, in the vehicle seat of the fourth aspect, assembly directions of the first guide member, the legs, the second guide member and the first and second interacting members are unified into the front and rear directions on the basis of the seat body. Thus the efficiency of assembly of the vehicle seat is improved.

A fifth aspect of the present invention relates to the vehicle seat of one of the second to the fourth aspects wherein the pair of legs is coupled together by a coupler member, and at least one of the first and second gears comprises a pressure-contact member that protrudes in a direction of a rotation axis from a position spaced from the rotation axis thereof and is pressure-contacted with the legs or the coupler member.

In the fifth aspect of the vehicle seat, pressure-contact member protruding in a direction of a rotation axis at an area apart from the rotation axis thereof in the rotation axis direction is provided at least one of the first and second gears. The pressure contact member is pressure-contacted with the legs or the coupler member, and thus, the leg is urged directly or indirectly so as to be pressure-contacted with another member provided opposite to the first and second gears with respect to the leg or the coupler member. Accordingly, chattering of the legs can be effectively prevented or suppressed.

A sixth aspect of the present invention relates to the vehicle seat of one of the second to the fifth aspects further comprising a lower-end guide for displacing a vertically lower end of the legs rearward of the seat back in conjunction with an upward movement of the legs relative to the seat back, and a fulcrum point placed in contact against a vertically intermediate part of the legs above a contact point to incline forward of the seat back about the contact point with the legs due to a displacement of the lower end of the legs rearward of the seat back.

In the sixth aspect of the vehicle seat, when each of the legs moves upward relative to the seat back, the guide means displaces the legs at the lower ends thereof toward the rear of the seat back.

On the other hand, the fulcrum point is in abutment against an intermediate portion of the legs. When the lower end of the legs displace toward the rear of the seat back, the fulcrum point let the legs incline around the abutment point against the legs toward the front of the seat back, in the above of the abutment point against the leg.

Consequently, in the vehicle seat, by ascending the legs, the portions of the legs upper than the fulcrum point and ultimately, the headrest move toward the front, i.e., toward the head of the passenger sitting on the vehicle seat. Thus, the headrest can be moved toward the front even in case when each of the first and second interacting members applies a force so as to move the legs vertically.

A seventh aspect of the present invention relates to the vehicle seat of the sixth aspect wherein the lower-end guide comprises a slider guide that is provided to be inclined such that the upper portion thereof with respect to a vertical of the seat body is positioned rearward relative to a lower portion, and having a guide surface formed in a planar form that continues from the lower end to an upper end of the slider, and a slider coupled to the lower ends of the legs and provided to slide between lower and upper portions of the lower-end guide while being guided along the guide surface in contact with the guide surface.

In the seventh aspect of the vehicle seat, the slider moves vertically while guided along the guide surface of the slider guide. The slider guide is inclined so that the slider displaces farther at the upper end thereof than at the lower end thereof toward the rear of the seat body. When the slider ascends while guided along the guide surface, the slider displaces toward the rear of the seat body. Consequently, the lower ends of the legs coupled with the slider displace toward the rear of the seat body.

The slider is in face contact with the guide surface of the slider guide. Consequently, the slider has at its contact area a surface pressure reduced compared with a structure wherein the slider is in linear contact or in point contact with the guide surface (e.g., s structure wherein the slider is a hollow or solid cylinder).

In the vehicle seat according to the first aspect, when a predetermined load is applied to the seat back, the headrest can be moved forward.

In the vehicle seat according to the second aspect, move amount of the pair of legs can be set without restriction in accordance with the move amount of the movable part of the load detecting means.

In the vehicle seat according to the third aspect, one and the other legs of the pair move simultaneously, and the vehicle seat is less prone to entanglement. Thus, the headrest can be displaced toward the front without failure.

In the vehicle seat according to the fourth aspect, the efficiency of assembly of the legs, the first guide member, the second guide member, the first interacting member and the second interacting member is improved.

In the vehicle seat according to the fifth aspect, chatter at the legs can be effectively prevented or suppressed.

In the vehicle seat according to the sixth aspect, the headrest can be displaced toward the front only by sliding the legs upward without applying to the legs or the headrest a force for displace the headrest toward the front.

In the vehicle seat according to the seventh aspect, surface pressure can be reduced between the slider and the guide surface of the slider guide. Accordingly, against the load any one of the slider and the slider guide applies to the other, the other can bear the load even when mechanical strength thereof is not especially high.

DESCRIPTION OF THE PREFERRED EMBODIMENTS

1. First Embodiment

<Basic Constitution of Vehicle Seat 10>

Figure 1:
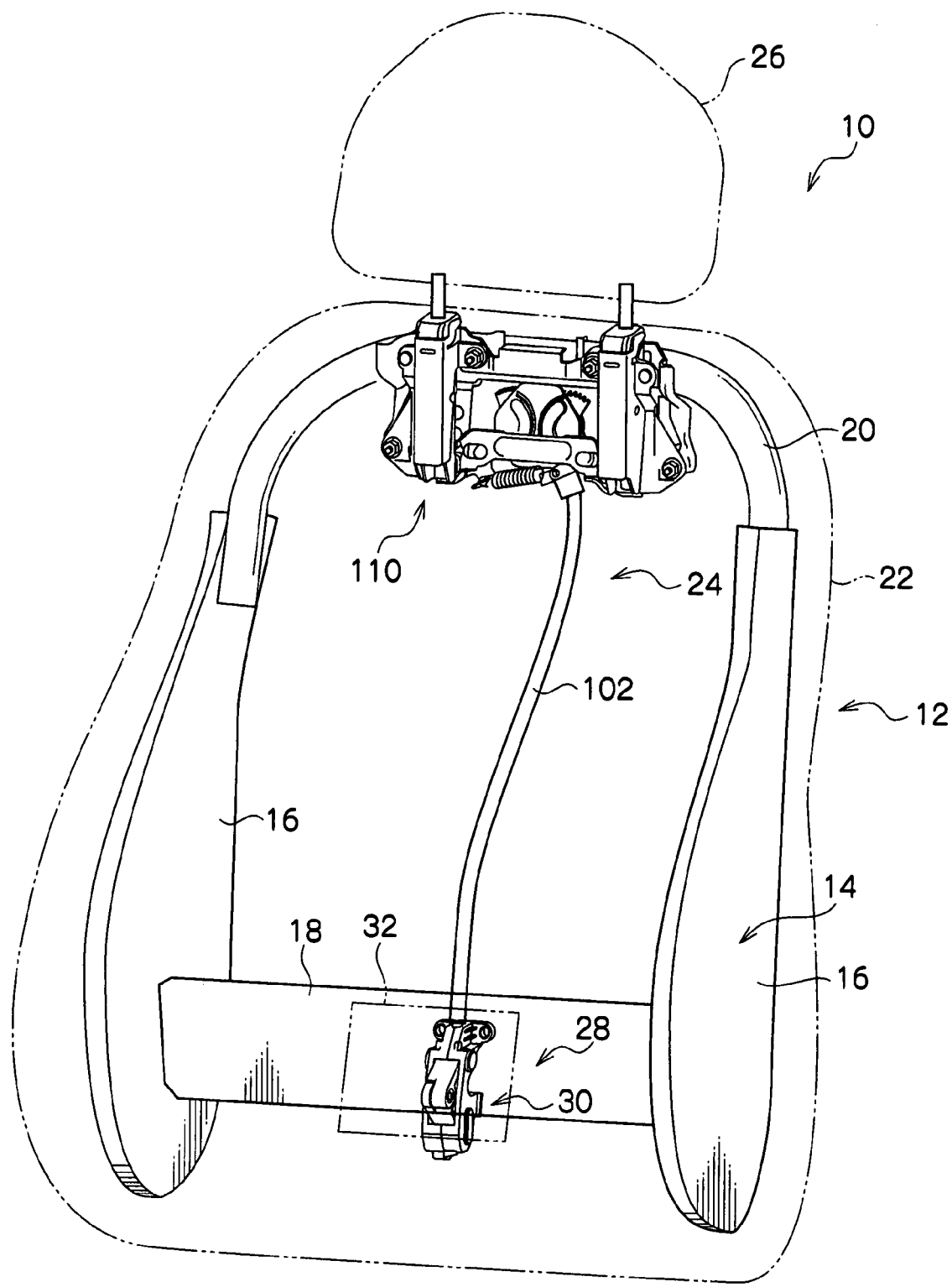
FIG. 1 is a schematic perspective view showing the essential part of a vehicle seat according to a first embodiment of the present invention.

FIG. 1 shows a perspective view of an essential-part structure of a vehicle seat 10 according to a first embodiment of the present invention.

As shown in the FIG. 1, the vehicle seat 10 has a seat back 12 constituting a seat body. The seat back 12 has a seat-back frame 14 making up a skeleton member for the seat back 12. The seat-back frame 14 has a pair of side frames 16. Each of the side frames 16 is formed as a plate having a thickness thereof arranged in the widthwise of the vehicle seat 10, and disposed so as to face each other in the widthwise of the vehicle seat 10.

A lower frame 18 is provided between lower ends of the side frames 16. The lower frame 18 is formed as a plate having a thickness thereof basically arranged in the thickness direction of the vehicle seat 10. The lower frame 18 has one end fixed to one of the side frames 16 and the other end to the other of the side frames 16. Due to this, the both side frames 16 are connected together at their lower ends through the lower frame 18.

Meanwhile, an upper pipe 20 is provided between the upper ends of the respective side frames 16. The upper pipe 20 is formed by a pipe member having a circular section that is curved generally concave in form (or generally U in form) in a manner opening to the lower of the vehicle seat 10. The upper pipe 20 has one end firmly fixed to the upper end of the one side frame 16 and the other end to the upper end of the other side frame 16. Due to this, the both side frames 16 are connected together at their upper ends through the upper pipe 20.

The seat-back frame 14 is covered with a pad 22 formed of a urethane resin or the like. Furthermore, the pad 22 is covered with a not-shown surface material formed of cloth, leather or the like.

Above the seat back 12, there is arranged a headrest 26 constituting an active headrest device 24 corresponding to a headrest moving mechanism and structuring a seat body. This allows the passenger, sitting on a not-shown seat cushion provided underneath the seat back 12, to recline at the back of his/her head on the active headrest device 24.

<Constitution of Active Headrest Device 24>

(Constitution of Load Detector 28)

Figure 2:
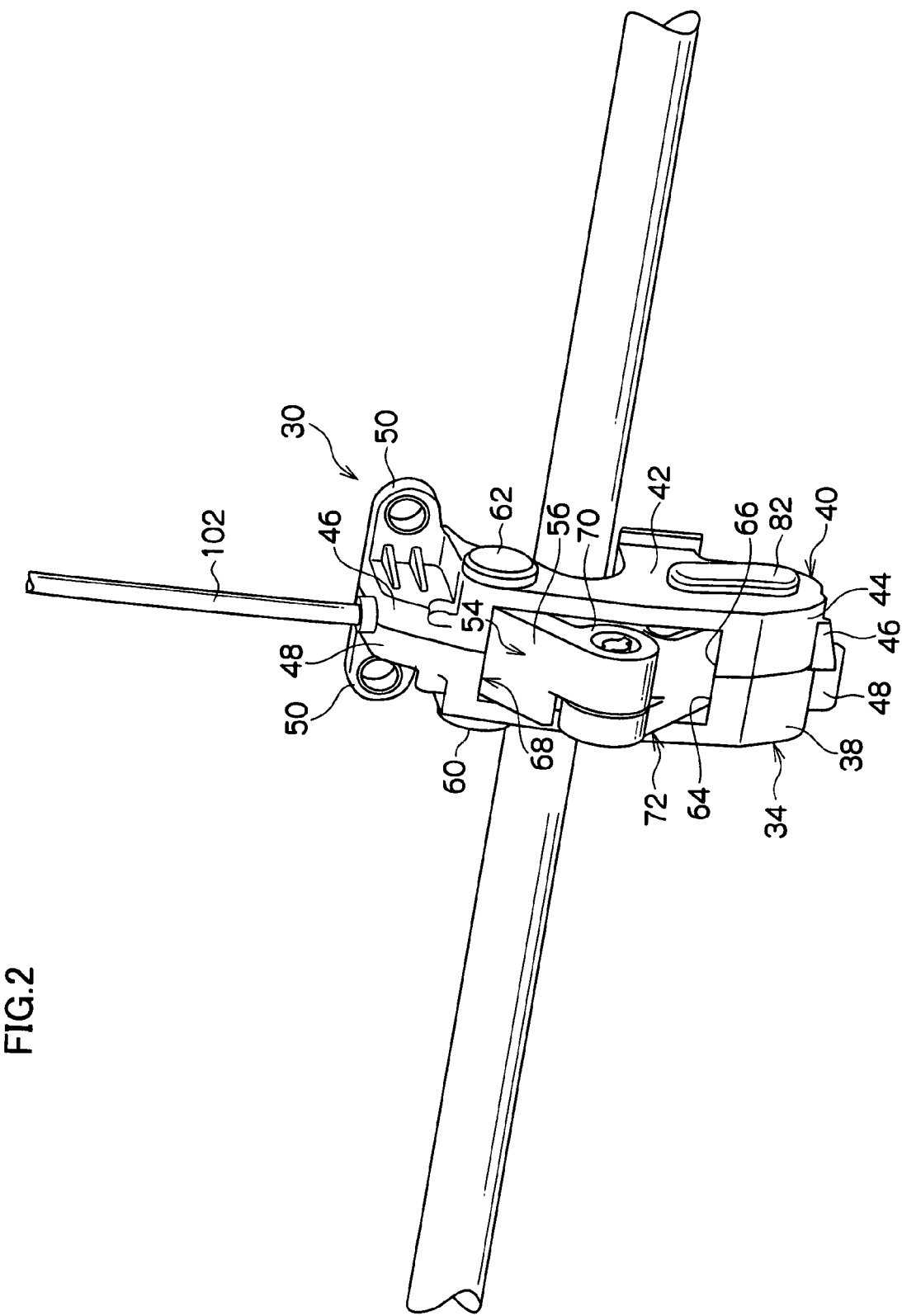
FIG. 2 is a perspective view of a detector of load detecting means of the vehicle seat according to the first embodiment.

As shown in FIG. 1, the active headrest device 24 has a load detector 28 corresponding to the load detecting means of the vehicle seat according to the present invention. The load detector 28 is structured with a detector body 30 serving as a force-delivery portion and a force-delivery plate 32. FIG. 2 is a perspective view showing the detector body 30 with magnification while FIG. 3 is an exploded perspective view of the detector body 30.

Figure 3:
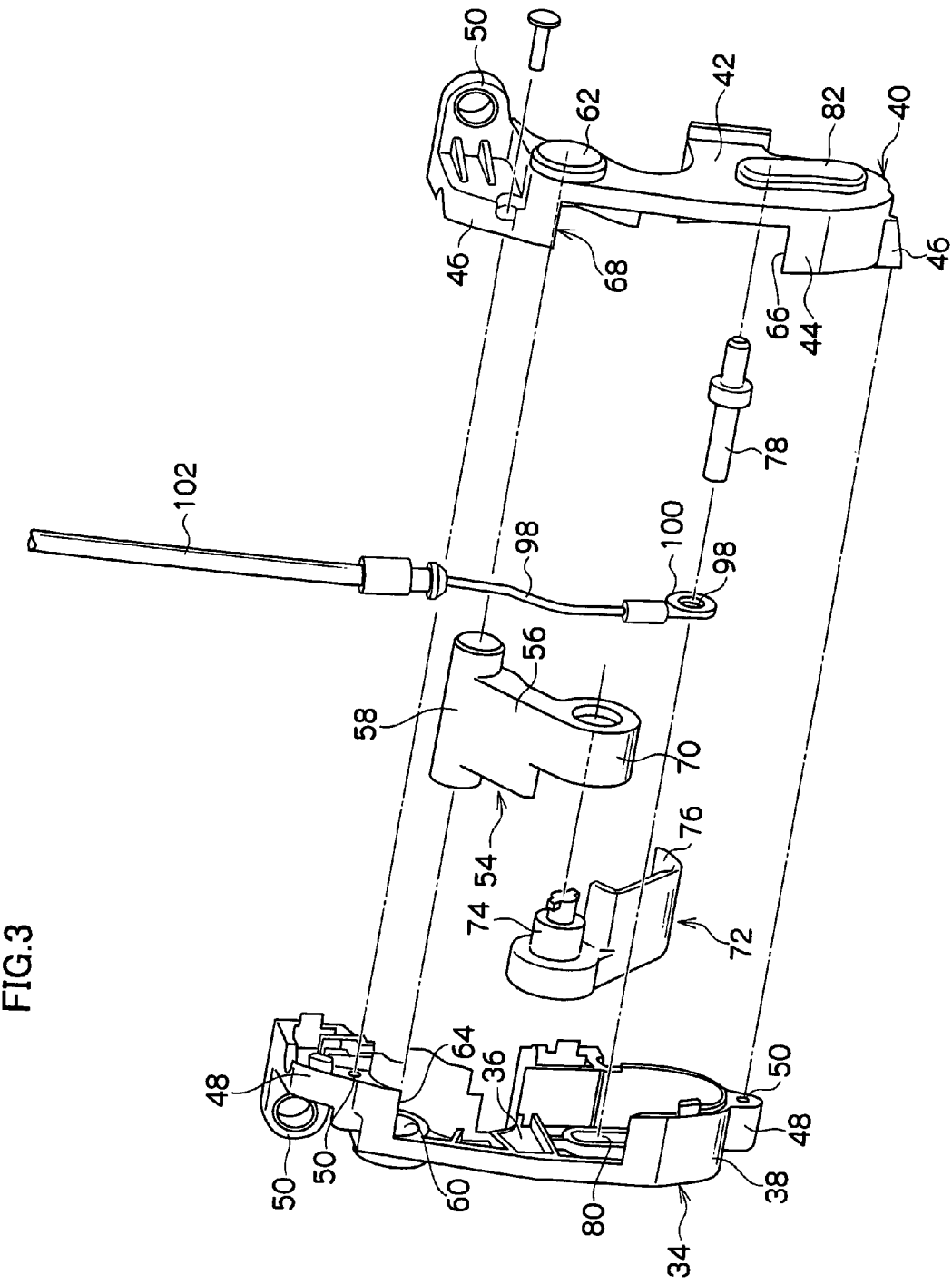
FIG. 3 is an exploded perspective view of the detector of the load detecting means of the vehicle seat according to the first embodiment.

As shown in FIGS. 2 and 3, the detector body 30 has a rightward housing 34. The rightward housing 34 has a bottom wall 36 provided having a thickness arranged in the widthwise of the vehicle seat 10. Meanwhile, the rightward housing 34 has a peripheral wall 38. The peripheral wall 38 is formed along the outer periphery of the bottom wall 36. Thus, the rightward housing 34 is made in a bottomed form opening to the left of the vehicle seat 10. A leftward housing 40 is provided in the left of the rightward housing 34 with respect to the widthwise of the vehicle seat 10. The leftward housing 40 has a bottom wall 42 having a thickness arranged in the widthwise of the vehicle seat 10. Meanwhile, the leftward housing 40 has a peripheral wall 44. The peripheral wall 44 is formed along the outer periphery of the bottom wall 42. Thus, the leftward housing 40 is made in a bottomed form opening to right of the vehicle seat 10.

A fixing portion 46 is formed on an outer periphery of the peripheral wall 44. A fixing pin, which is not shown in figures and projects toward the right with respect to the widthwise of the vehicle seat 10, is provided on an outer periphery of the peripheral wall. Correspondingly to the fixing portion 46 where the fixing pin is formed, a fixing portion 48 is formed on the outer periphery of the peripheral wall 38. An opening, which opens toward the left with respect to the widthwise of the vehicle seat 10, is provided on the fixing portion 48. The fixing pin of the fixing portion 46 is inserted in the hole so as to fix the leftward housing 40 on the rightward housing 34. Thus, the rightward housing 34 and the leftward housing 40 are mutually closed at their opening ends thus wholly providing a hollow space therein.

Furthermore, mount protuberances 50 are respectively formed in the fixing portions 48, 46 of the rightward and leftward housings 34, 40. A bolt is passed through the mount protuberances 50 and the lower frame 18 and screwed with a nut, thereby fixing the rightward and leftward housings 34, 40 on the lower frame 18.

Meanwhile, the detector body 30 has a swing piece 54 serving as a movable part. The swing piece 54 has a swing piece body 56. A shaft 58 having an axis extending along the widthwise of the vehicle seat 10 is provided at the swing piece body 56. Corresponding to one end of the shaft 58, a bearing 60 having a circular section and opening to the left with respect to the widthwise of the vehicle seat 10 is formed on the bottom wall 36 of the rightward housing 34. Corresponding to the other end of the shaft 58, a bearing 62 having a circular section and opening to the right with respect to the widthwise of the vehicle seat 10 is formed coaxially to the bearing 60 on the bottom wall 42 of the leftward housing 40. The bearing 60 rotatably supports one end of the shaft 58 while the bearing 62 rotatably supports the other end of the shaft 58.

The portion of the swing piece body 56 opposite to the shaft 58 protrudes to the outside of the rightward and leftward housings 34, 40 through a rectangular aperture 68 configured by a cutout 64 formed in the peripheral wall 38 of the rightward housing 34 and a cutout 66 formed in the peripheral wall 44 of the leftward housing 40. Furthermore, a coupler 70 is formed on the swing piece body 56 at the portion opposite to the shaft 58 so that the coupler 70 is coupled with a coupling shaft 74 of a slider 72 rotatably around an axis extending widthwise of the vehicle seat 10. The slider 72 has a portion opposite to the coupling shaft 74, which portion extends into the rightward and leftward housing 34, 40 through the aperture 68.

A shaft receiver 76 is formed at a position of the slider 72 opposite to the coupler shaft 74 so that the shaft receiver 76 can receive therein a slide shaft 78 having an axis extending widthwise of the vehicle seat 10. On the bottom wall 36 of the rightward housing 34, a guide groove 80 is formed corresponding to one axial end of the shaft receiver 76 and opening to left with respect to the widthwise of the vehicle seat 10.

Correspondingly, in the bottom wall 42 of the leftward housing 40, a guide groove 82 is formed corresponding to the other end of the shaft 58 and opening to right with respect to the widthwise of the vehicle seat 10. Each of the guide grooves 80, 82 is made in the form of an elongate hole extending in a height direction of the vehicle seat 10, each of which has a width slightly greater than the outer diameter of the slide shaft 78. The guide groove 80 guides one end of the slide shaft 78, received in the guide groove 80, along the longitudinal direction thereof, while the guide groove 82 guides the other end of the slide shaft 78, received in the guide groove 82, along the longitudinal direction thereof.

In the state that the slide shaft 78 is at the ends of the elongate guide grooves 80, 82 closer to the bearings 60, 62, when the coupler 70 is pushed toward inside of the rightward and leftward housings 34, 40, the coupler shaft 74 of the slider 72 is moved inward of the rightward and leftward housings 34, 40 together with the coupler 70 while rotating relative to the coupler 70. Due to the movement of the coupler 70, the shaft receiver 76 moves together with the slide shaft 78 along the guide grooves 80, 82 in a manner separating from the shaft 58 supported by the bearings 60, 62.

Figure 4:
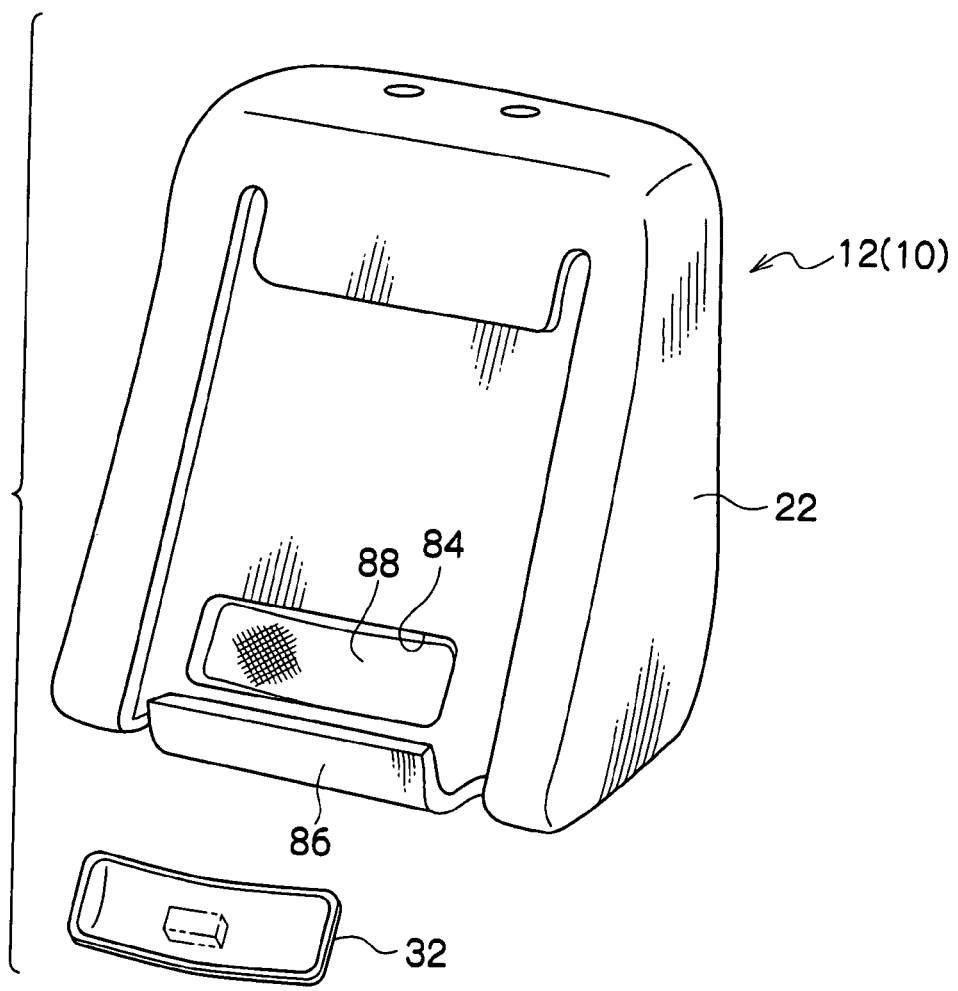
FIG. 4 is a perspective view showing a force-delivery portion and pad of the load detecting means of the vehicle seat according to the first embodiment.
Figure 5:
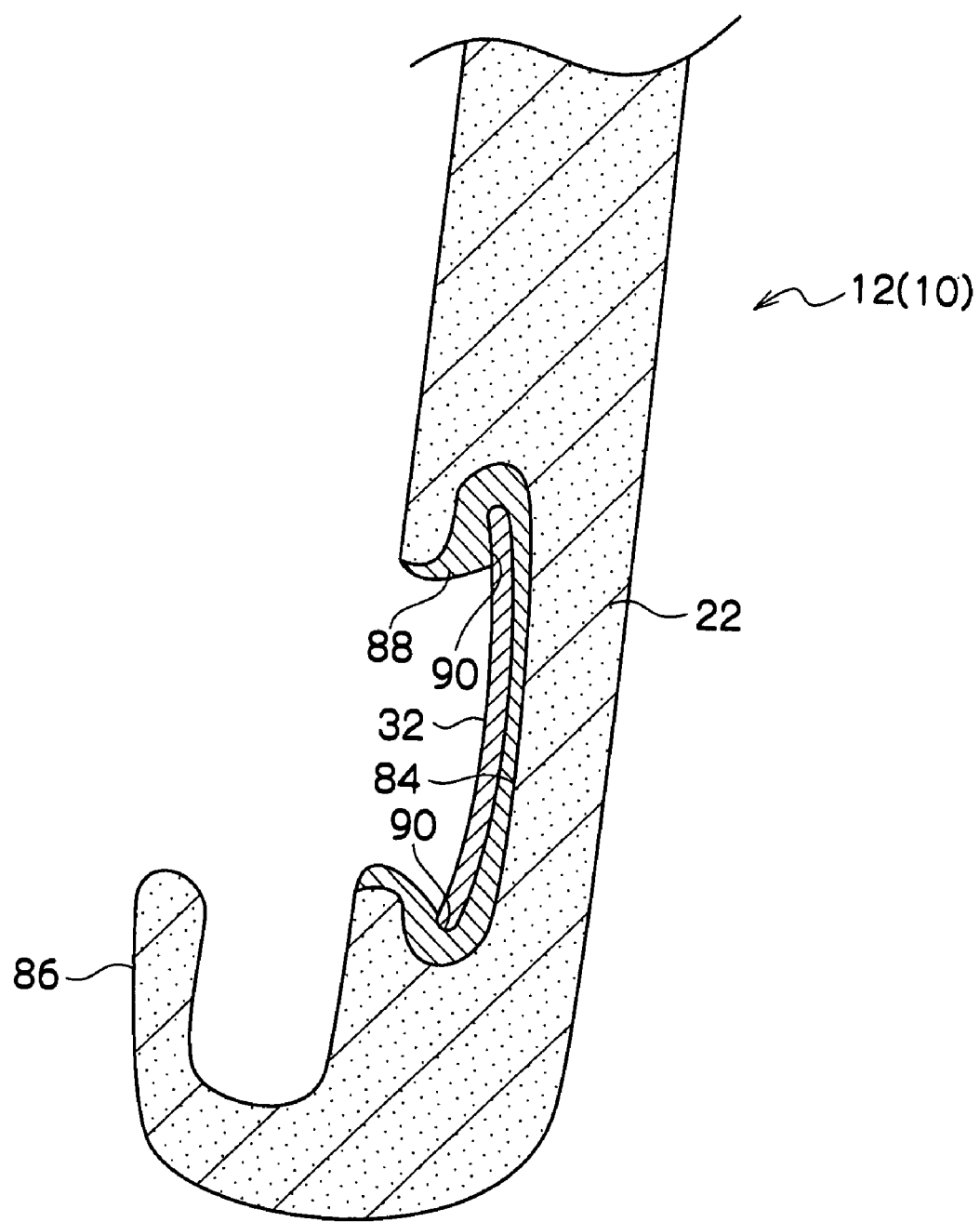
FIG. 5 is a sectional view of the force-delivery portion and pad of the load detecting means of the vehicle seat according to the first embodiment.

A force-delivery plate 32 is provided in front of the coupler 70 protruding through the aperture 68. As shown in FIG. 1, the force-delivery plate 32 is a plate-like member arranged so that the thickness direction thereof is in the front to the rear direction of the vehicle seat 10. The force-delivery plate 32 is arranged so that one surface (back surface) thereof is opposed to the coupler 70. As shown in FIGS. 4 and 5, a recess 84 is formed in the pad 22 of the seat back 12 correspondingly to the force-delivery plate 32. The recess 84 opens on a back surface of the pad 22, in a position above the engager 86, which engages with the lower frame 18 of the pad 22 and is supported thereby.

As shown in FIGS. 4 and 5, a supporter 88 is provided in the recess 84. The supporter 88 is formed of a metal or synthetic resin higher in rigidity than the pad 22, and firmly fixed on the inner surface of the recess 84 through an adhesive or the like. Otherwise, by insert-forming the supporter 88 upon forming the pad 22, the supporter 88 is provided in the recess 84. The supporter 88 is in a recess form opening nearly in the same direction as the opening direction of the recess 84. Meanwhile, the supporter 88 has an inner periphery smaller than the outer periphery of the force delivery plate 32.

Nevertheless, in the vicinity of the bottom of the supporter 88 an attachment groove 90 is formed continuously along the inner periphery of the supporter 88, having an opening to the radially inward of the opening of the supporter 88. The force delivery plate 32, at and around its outer periphery, is received in the attachment groove 90, thus being held in the supporter 88. In the event that a pressing force is conveyed to the force delivery plate 32 through the pad 22 and supporter 88 bottom from the opposite side to the opening of the supporter 88, i.e. from front of the vehicle seat 10, the force delivery plate 32 moves toward and pushes the opposed coupler 70.

Incidentally, although it is explained in the present embodiment that the force delivery plate 32 is a mere plate member, the force delivery plate 32 can be formed so as to be easily deformed toward the coupler 70 by a pressing force applied from the front of the vehicle seat 10, by differentiating the stiffness thereof by properly increasing or decreasing in the thickness (wall thickness) thereof or by partly removing of its wall by forming through-holes in proper positions thereof. Otherwise, by combining strip-shaped leaf springs into a force delivery plate 32 that is wholly flat, so as to make the force delivery plate 32 easily deform toward the coupler 70 by the pressing force applied from the front of the vehicle seat 10.

Furthermore, for preventing deformation of the force delivery plate 32 by the reaction force from the coupler 70 upon the force delivery plate 32 pressing the coupler 70 on the region facing the coupler 70, the rigidity of the region of the force delivery plate 32 facing the coupler 70 can be set higher than the other region thereof by increasing the plate thickness of the region or forming a rib, or other.

Figure 6:
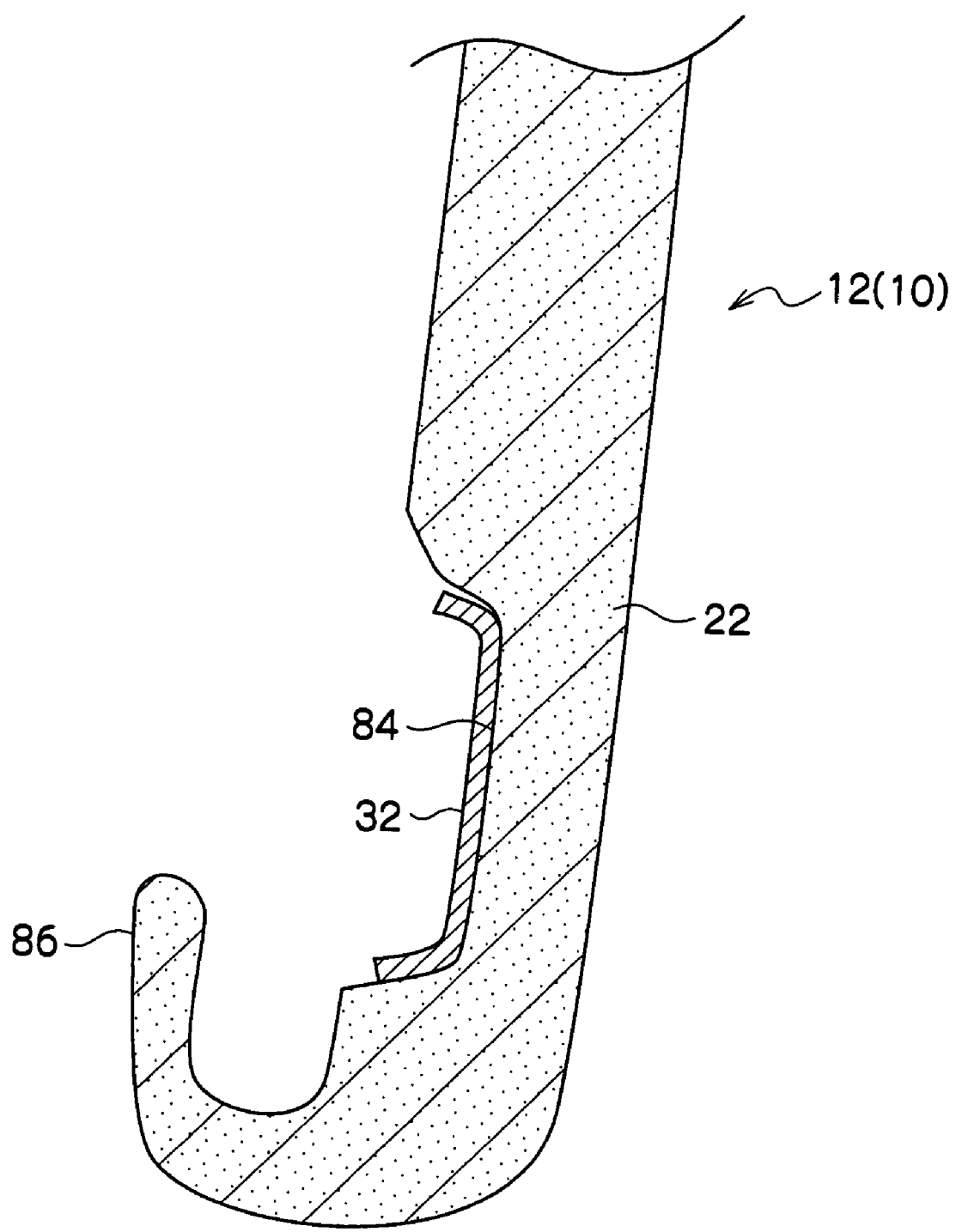
FIG. 6 is a sectional view showing a modification to the force-delivery portion and pad of the load detecting means.
Figure 7:
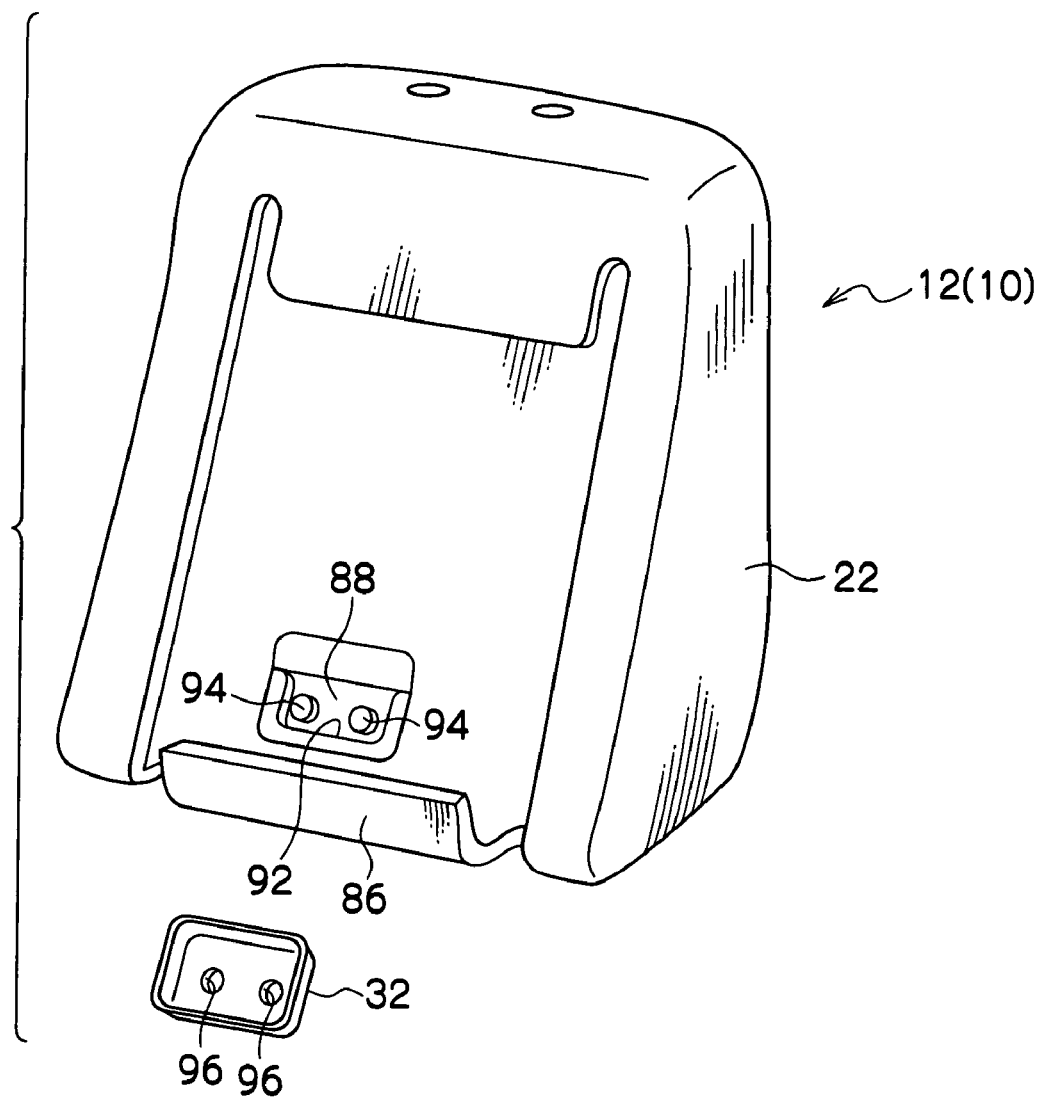
FIG. 7 is a sectional view showing another modification to the force-delivery portion and pad of the load detecting means.
Figure 8:
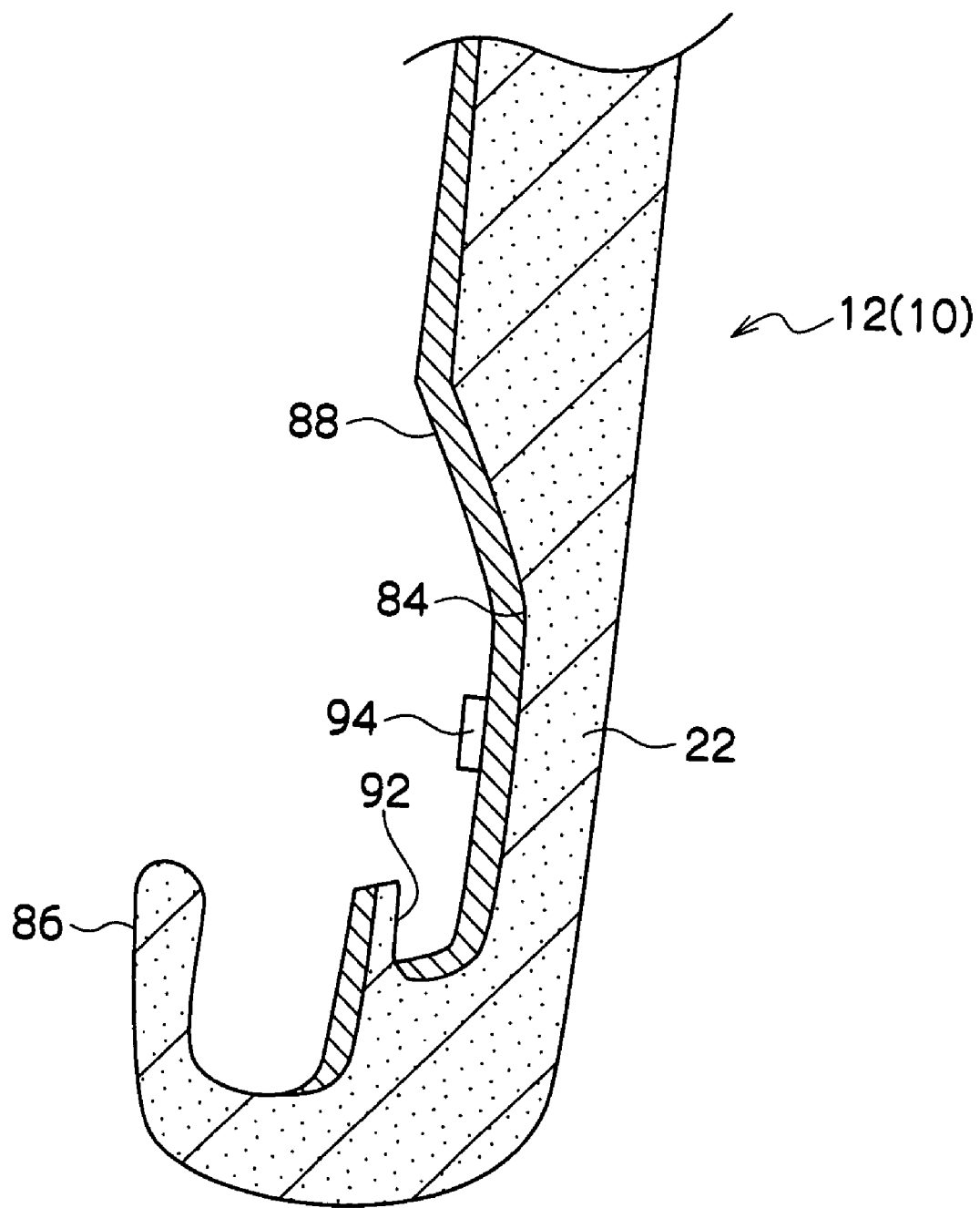
FIG. 8 is a sectional view showing another modification to the force-delivery portion and pad of the load detecting means.

Additionally, although in the present embodiment, as mentioned in the above, the vehicle seat 10 is constructed so that the force delivery plate 32 is held in the attachment groove 90 of the supporter 88 provided in the recess 84, as shown in FIG. 6 the force delivery plate 32 may be firmly fixed in the recess 84 by an adhesive or the like. Furthermore, as shown in FIGS. 7 and 8, the force delivery plate 32 may be fixed in the recess 84 by inserting into a pocket 92 that is formed in a lower region of the inner periphery of the recess 84 and opens upward and engaging the removal preventing projections 94, which are portions protruding from the supporter 88 or portions formed of a part of the pad 22 penetrating through holes formed in the supporter 88, with holes 96 opening thereon.

Further, while detailed explanation based on a figure is omitted, the force delivery plate 32 may be arranged in the pad 22 by insert-forming the force delivery plate 32 upon forming the pad 22.

Meanwhile, as shown in FIG. 3, the slide shaft 78 passes through a plate 100 corresponding a coupler and being provided at one end of a cable 98. By moving the plate 100 together with the slide shaft 78 along the guide grooves 80, 82, the cable 98 is pulled by the slide shaft 78 or pull of the cable 98 by the slide shaft 78 is released. The recess 84 allows a tube 102 to pass through, the other end of which is led to a slide unit 110.

(Constitution of Slide Unit 110)

Figure 9:
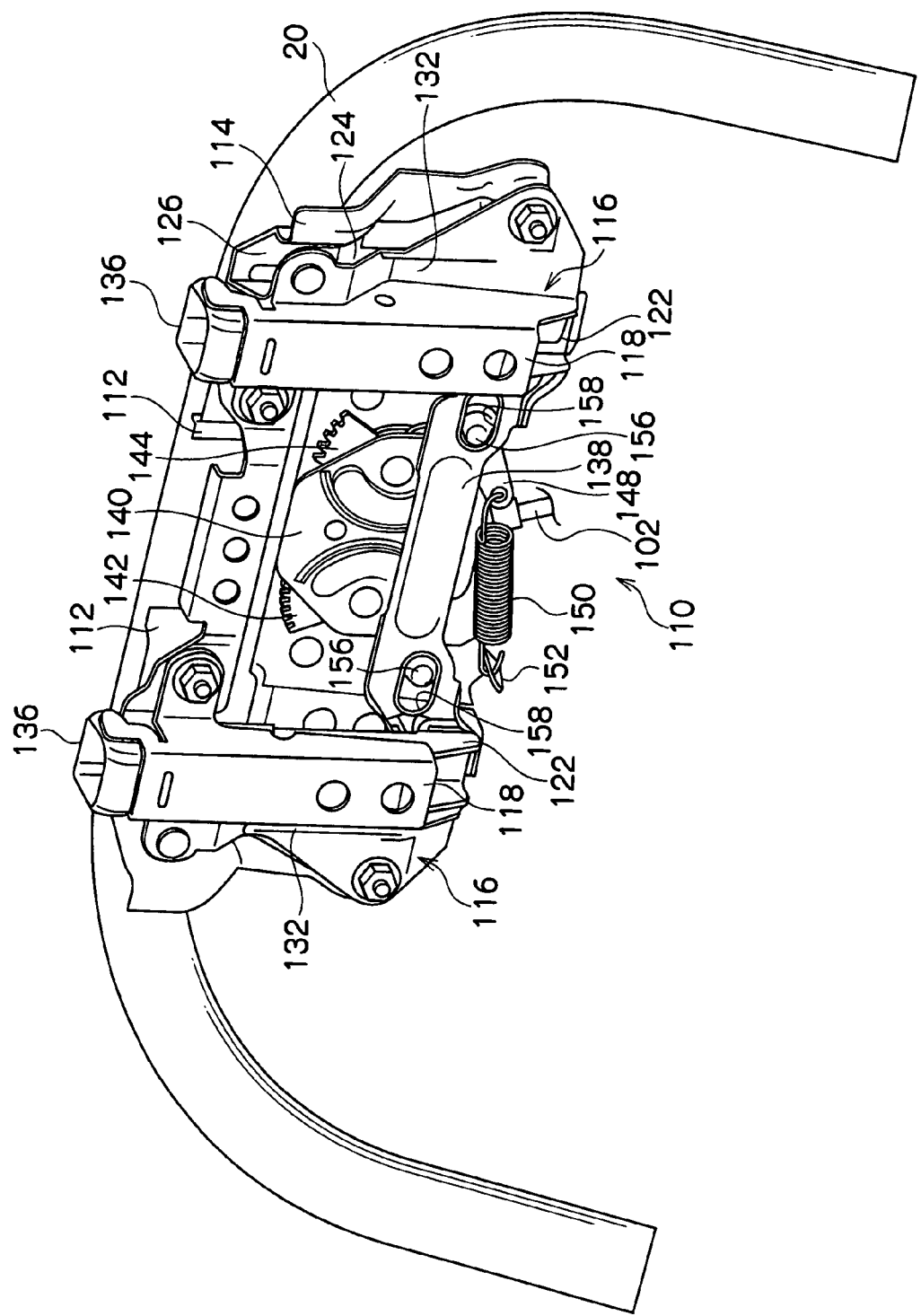
FIG. 9 is a perspective view of a slide unit of the vehicle seat according to the first embodiment.

FIG. 9 shows a perspective view of a structure of the slide unit 110. Meanwhile, FIG. 11 shows an exploded view of the structure of the slider unit 110.

Figure 11:
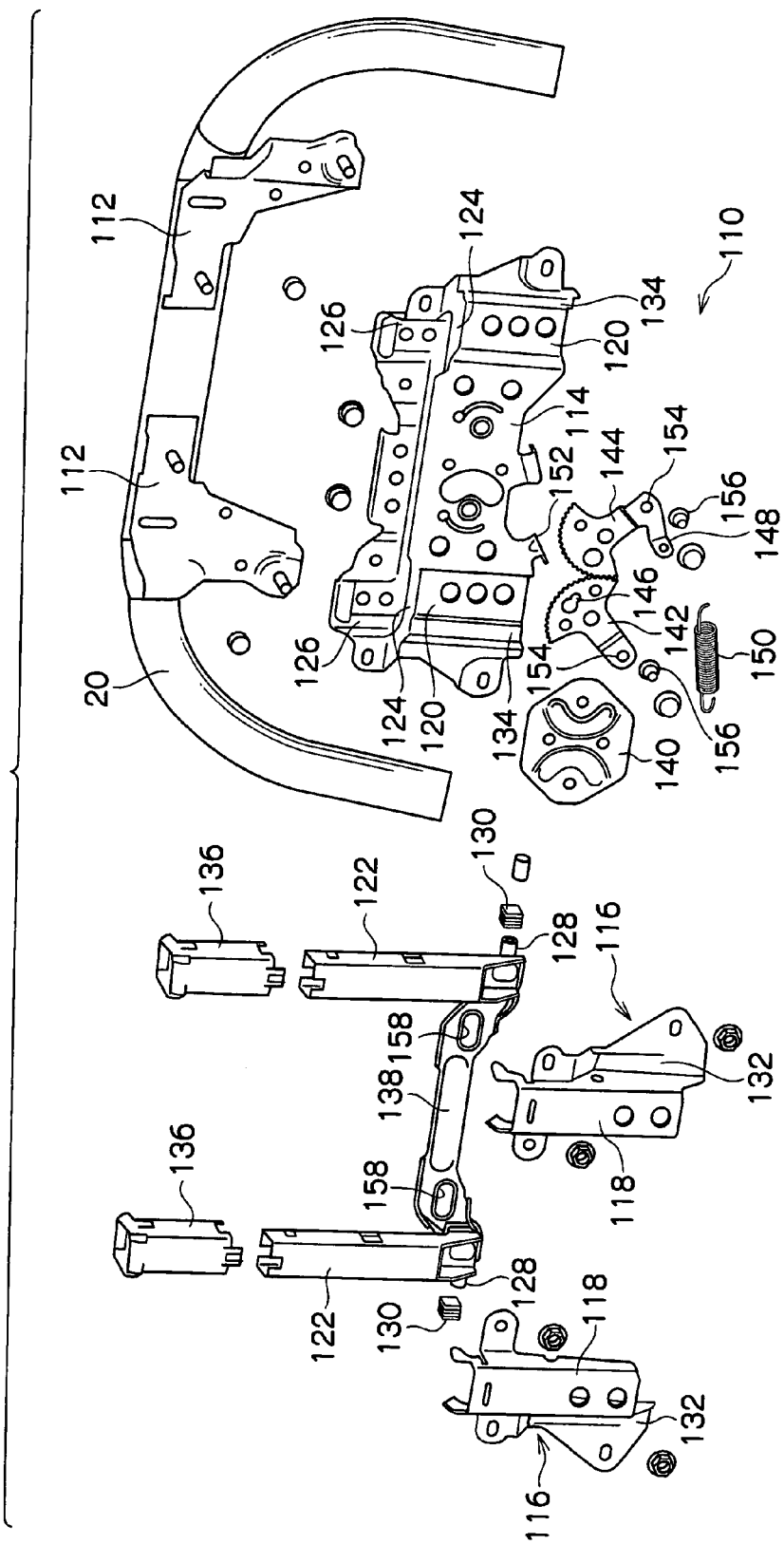
FIG. 11 is an exploded perspective view of the slide unit.

As shown in FIGS. 9 and 11, the slide unit 110 has a pair of left and right unit brackets 112 corresponding to a support provided on the vehicle seat according to the present invention. The unit brackets 112 are made as plate-like members properly curved or bent. One unit bracket 112 is fixed on the upper pipe 20 in a position closer to one side frame 16 by means of screws, etc. while the other unit bracket 112 is fixed on the upper pipe 20 in a position closer to the other side frame 16 by means of screws, etc.

A base plate 114 is attached on the unit brackets 112, which corresponds to a second guide member of guide means of the vehicle seat according to the present invention. The base plate 114 is disposed so that the thickness thereof is arranged in the front to rear direction of the vehicle seat 10 and is made as a member curved or bent properly. In front of the base plates 114, a left bracket guides 116 and a right bracket guide 116 are provided corresponding to a first guide member of the guide means. One of the left and right bracket guides 116 is fixed on the base plate 114 in a position closer to the one side frame 16 by means of screws, etc. while the other of the left and right bracket guides 116 is fixed on the base plate 114 in a position closer to the other side frame 16 by means of screws, etc.

Each of the bracket guides 116 comprises a guide body 118 having a C sectional form opening toward the base plate 114. The base plate 114 includes base-side guides 120, each of which bents in a C sectional form opening toward the bracket guide 116, correspondingly to the guide body 118. The base-side guides 120 are respectively so as to face each of the guide bodies 118. Headrest brackets 122, or legs, are arranged respectively between the guide bodies 118 and the base-side guides 120.

Each headrest brackets 122 is formed as a cylindrical body having a perpendicular section and extending in a substantially vertical direction with respect to the vehicle seat 10. Each headrest bracket 122 has an outer periphery sufficiently smaller than inner periphery formed by the guide bodies 118 facing the base-side guides 120. Each headrest bracket 122 is allowed to move inside of the guide bodies 118 and base-side guides 120 along a vertical direction of the vehicle seat 10. In addition, each headrest bracket 122 is also allowed to move in the front and rear direction of the vehicle seat 10 toward a position where the headrest brackets 122 are interfered with the guide bodies 118 or the base-side guides 120.

Guide protuberances 124, which correspond to the fulcrum point of the present invention, are respectively formed on the base plate 114, at the upper ends of the base-side guides 120. Each guide protuberance 124 has one end continuing the upper end of each base-side guide 120. The other end of each guide protuberance 124 is positioned above and forwards the one end thereof with respect to the vehicle seat 10. The other end of each guide protuberance 124 is in abutment against a part of the outer peripheral surface of each headrest bracket 122. In-normal supports 126 are formed on the base plate 114, at the other ends of the guide protuberances 124. Each of the in-normal supports 126 is made in a concave form opening toward the guide bodies 118 similarly to the base-side guides 120. However, each in-normal support 126 has an inner width given slightly greater than the width of the headrest brackets 122, with respect to the widthwise of the vehicle seat 10.

Meanwhile, in the rear and at around the lower end of each headrest bracket 122, a shaft 128 is provided integrally. A slider 130 is rotatably supported on the shaft 128. The slider 130 is a rectangular block when viewed from the front, and thus, configuring a lower-end guide of the guide means of the present invention. A slider guide 132 is formed in each bracket guide 116 so as to correspond to the slider 130. Together with the slider 130, the slider guide 132 constitutes, as a slider guide, the lower-end guide of the guide means. A pair of slider guide surfaces 134 facing each slider guide 132 are provided on the base plate 114. Together with each of the slider guides 132 and the sliders 130, the slider guide surfaces 134, as a slider guide, also constitute the lower-end guide of the guide means. The sliders 130 are interposed between the slider guides 132 and the slider guide surfaces 134 so as to slide vertically with respect to the vehicle seat 10 while being guided by the slider guides 132 and the slider guide surfaces 134.

Nevertheless, because the slider guides 132 and the slider guide surfaces 134 are provided inclining rearward of the vehicle seat 10 in the upward direction, the sliders 130 displace toward the rear of the vehicle seat 10 as sliding to the upper while being guided by the slider guides 132 and slider guide surfaces 134.

Figure 12B:
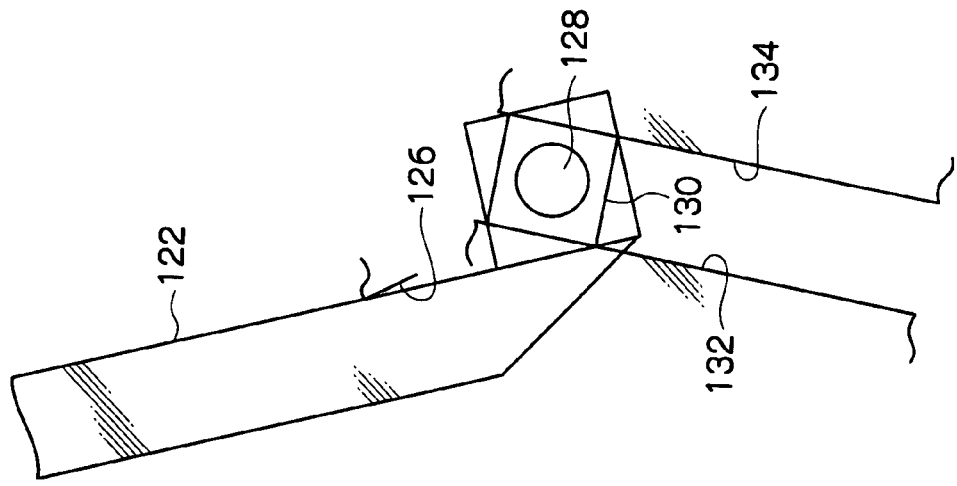
FIG. 12B is a typical view showing the slide unit in a state after operation.
Figure 12A:
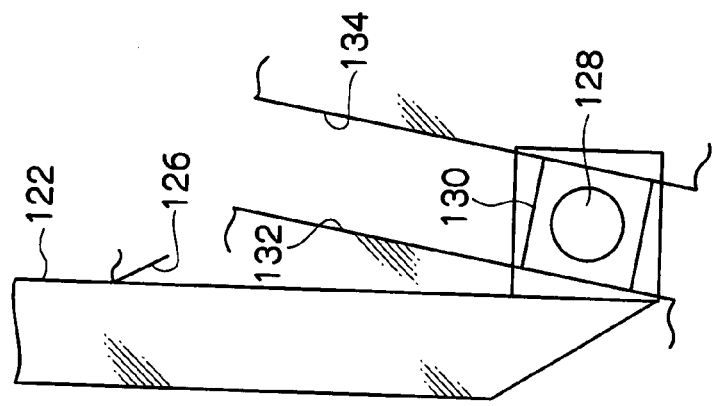
FIG. 12A is a typical view showing the slide unit in a state before operation.

As sown in FIGS. 12A and 12B, the sliders 130 displace toward the rear as the sliders 130 slide upward, thereby displacing the lower end of each headrest bracket 122 toward the rear. By the rearward displacement at the lower end thereof, each headrest bracket 122 rotates around the abutment point at which the headrest brackets 112 contact the guide protuberances 124. Consequently, the headrest brackets 122 rotate toward the front, in the position upper than the abutment point with the guide protuberances 124.

As shown in FIGS. 9 and 11, guide spacers 136, formed as a rectangular cylinder, are respectively arranged at the tips (upper ends) of the headrest brackets 122 operating as mentioned above. Furthermore, above the guide spacers 136, the headrest 26 is attached. While, a connecting bracket 138, or connection member, is provided backside of the base ends (lower ends) of the headrest brackets 122. The connecting bracket 138 is formed as a plate having a length extending widthwise of the vehicle seat 10 and a thickness extending lengthwise of the vehicle seat 10. One end of the connecting bracket is connected with one headrest bracket 122 and the other end of the connecting bracket is connected with the other headrest bracket 122.

A cover plate 140 is arranged backside of substantially a lengthwise center of the connecting bracket 138. Furthermore, a pair of sector gears 142 and 144 are arranged backside of the cover plate 140. The sector gear 142, constituting the first interacting member as a first gear, and the sector gear 144, constituting a second interacting member as a second gear, are supported by the base plate 114 and the cover plate 140 rotatably around the respective axes thereof extending along the front and rear direction of the vehicle seat 10 in a mesh state with each other.

Additionally, a cable engager 146 is formed in the sector gear 142 in a position separated from the rotation center thereof, and connected with the other end of the foregoing cable 98. Furthermore, a spring engager 148 is formed in the sector gear 144 in a position opposite to the toothed section thereof with respect to the rotation center thereof. The spring engager 148 is engaged with one end of a return spring 150 constituted of a compression coiled spring. The other end of the return spring 150 is engaged with a spring engager 152 formed in the base plate 114. The sector gear 142, which is arranged to rotate by being pulled at the cable engager 146 by the cable 98, is constituted to rotate the sector gear 144 against the urging force form return spring 150.

Furthermore, holes 154 are formed in the portions of the sector gears 142 and 144 opposite to the toothed sections thereof with respect to the rotation centers, respectively. Taper pins 156 or pressure contacts are mounted at the holes 154, respectively. The taper pins 156 are pin bodies formed of metal or synthetic resin and attached on the sector gear 142 and 144 at the base portions thereof and having tip portions covered by coated portions formed of a synthetic resin. The coated portions of the taper pins 156 are formed in a taper reducing in the direction opposite to the base plate 114. Each of the taper pins 156 are respectively received in a pair of elongate holes 158 that are one form of a correction mechanism formed in the connecting bracket 138 and holes corresponding to the pressure contacts.

One of the elongate holes 158 is formed in the connecting bracket 138 in a position closer to one end than the lengthwise center thereof while the other of the elongate holes 158 is formed in the connecting bracket 138 in a position closer to the other end than the lengthwise center thereof. The elongate holes 158 are made long widthwise of the vehicle seat 10, each of which has a shorter inner width given smaller than the outer diameter of the base of each taper pin 156. The taper pins 156, received in the elongate holes 158, are in pressure contact at the taper surface thereof with the inner edge of the elongate holes 158.

Figure 10:
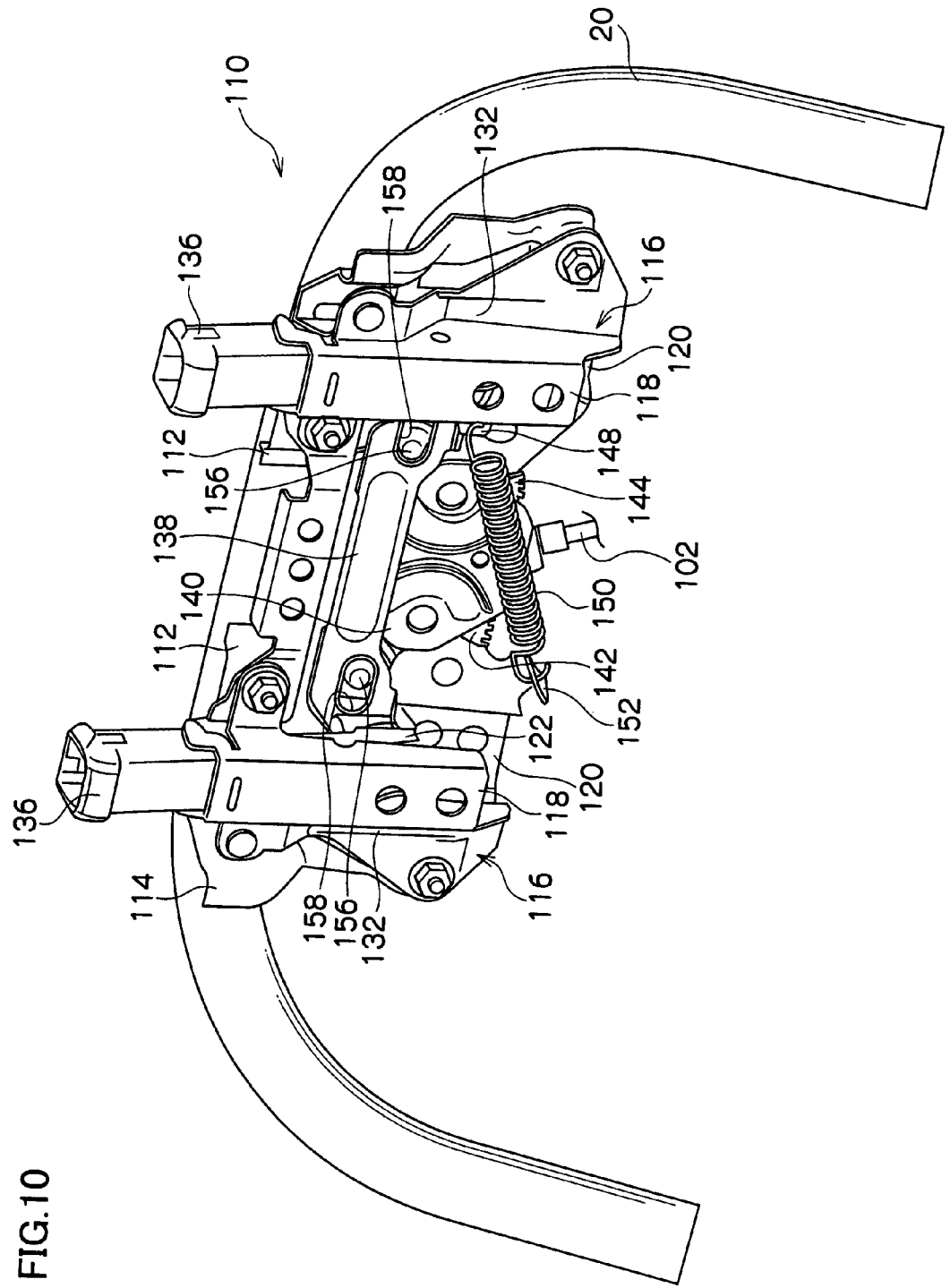
FIG. 10 is a perspective view showing the slide unit in an operation state.

As shown in FIG. 10, when the sector gear 142 rotates, the taper pin 156 fixed on the sector gear 142 pushes the inner periphery of one of the elongate holes 158 and moves the connecting bracket 138 vertically. Simultaneously, the taper pin 156 fixed on the sector gear 144 interacting with the sector gear 142, also pushes the inner periphery of the other of the elongate holes 158 and moves the connecting bracket 138 vertically.

In addition, in the present embodiment, the elongate holes 158 are delicately different from each other in shape and position depending upon backlash in the mesh of the sector gear 142 with the sector gear 144, or other. Thus, the timing of one or the other of the taper pins 156 pushing the inner periphery of the elongate hole 158 corresponding thereto is regulated.

[First Embodiment Operation and Effect]

(Operation and Effect in Function)

Now, explanation is made on the operation and effect of the present embodiment by way of explaining the operation of the active headrest device 24.

In the vehicle seat 10 having the active headrest device 24, when the seat back 12 is depressed from the front by the body of a passenger sitting on the vehicle seat 10 due to the reaction caused by a collision of a vehicle on which the vehicle seat 10 is mounted from behind by another vehicle (i.e. when the passenger sitting on the vehicle seat 10 forcedly leans against the seat back 12), the force-delivery plate 32 receives a force from the body of the passenger and moves toward the rear. The force-delivery plate 32 moving toward the rear pushes the coupler 70 of the swing piece 54 rearward.

The swing piece 54, whose coupler 70 is pushed by the force-delivery plate 32, rotates the slider 72 around the shaft 58. Consequently, the slider 72, coupled with the coupler 70, moves the slide shaft 78 toward the other ends of the guide grooves 80, 82. Accordingly, the slide shaft 78 moves and the cable 98 is pulled through the plate 100. By pulling the cable 98, the sector gear 142 rotates as shown in FIG. 10. Thereupon, the sector gear 144, in mesh with the sector gear 142, rotates against the urging force from the return spring 150.

By rotation of both sector gears 142 and 144, the taper pins 156 respectively fixed on the sector gears 142 and 144 push up the inner peripheries of the elongate holes 158, i.e. the connecting bracket 138. By pushing up the connector bracket 138, the both headrest brackets 122 move toward above. Due to the upward movement of the headrest brackets 122, the sliders 130 are slid toward above while being guided by the slider guides 132 and the slider guide surfaces 134.

As mentioned before, as the sliders 130 move sliding toward above while being guided by the slider guides 132 and slider guide surfaces 134, the sliders 130 displace toward the rear of the vehicle seat 10. Accordingly, the headrest brackets 122 also displace toward the rear at the lower ends thereof. Thus, because the headrest brackets 122 displace rearward at the lower ends thereof while ascending, the headrest brackets 122 rotate around the contact point contacting with the guide protuberances 124. Consequently, the headrest brackets 122 rotate toward the front in their upper portions than the contact points with the guide protuberances 124. Accordingly, the headrest 26, coupled with the headrest brackets 122 through the guide spacers 136, displaces toward the front.

When the back of the head of the passenger sitting on the vehicle seat 10 is not in contact with the headrest 26 in the state before the headrest 26 moves toward the front (when the back of the head of the passenger's head is in front of the headrest 26), the headrest 26 moves toward the back of the passenger's head by the frontward displacement thereof, and thus, the gap between the headrest 26 and the back of the passenger's head is reduced. Consequently, even in the event that the head of the passenger sitting on the vehicle seat 10 moves toward the rear due to the reaction of a collision from behind caused by another vehicle, the passenger's head can be swiftly caught by the headrest 26 without encountering a significant movement of the head toward the rear.

In the active headrest device 24 that is used in the vehicle seat 10, the sector gear 142 pushes up one of the headrest brackets 122 while the sector gear 144, interacting with the sector gear 142, pushes up the other of the headrest brackets 122. Since both headrest brackets 122 are pushed up simultaneously, there is no lateral entanglement upon raising the headrest brackets 122. The headrest brackets 122 are pushed up reliably and hence displace the headrest 26 toward the front without failure.

Meanwhile, it is possible to previously eliminate the difference in operation timing between the sector gears 142 and 144 caused by backlash therebetween or other by differentiating the position and shape of each elongate hole 158. Both headrest brackets 122 can be more simultaneously pushed up, and thus, the headrest 26 can be displaced toward the front without failure.

Furthermore, in the active headrest device 24 that is installed in the vehicle seat 10, the taper pins 156 having a tapered shape and pressed into the elongate holes 158 comprises tapered surface pressure contacting the inner peripheral edges of the elongated holes 158. Consequently, the both elongate holes 158 at their inner peripheries can be pushed respectively by the taper pins 156 simultaneously with initiation of rising of the both taper pins 156. Thus, the headrest brackets 122 can be simultaneously pushed up and hence the headrest 26 can be displaced forward without failure.

Meanwhile, in the active headrest device 24, each slider 130 is provided rectangular in front view. Consequently, of the four sides of the slider 130 in front view, there is provided a contact area with the slider guide 132 and slider guide surface 134 corresponding to the length of the sides extending along the slider guide 132 and slider guide surface 134. Accordingly, the surface pressure on the contact area between the slider guide 132 and the slider guide surface 134 can be reduced, and thus, the slider 130 slides smoothly and the headrest bracket 122 can be displaced upward and upward with a higher reliability.

Moreover, tapered surfaces of the taper pins 156 caught into the elongate holes 158 are in pressure-contact with the inner peripheral edges of the elongate holes 158. Accordingly, the chatter occurring between the sector gears 142 and 144 can be suppressed by the connecting bracket 138, and thus, conventional operation of the slide unit 110 proceeds quieter.

(Effect of the Vehicle Seat 10 in Fabrication Thereof)

Now explanation is made on effect of the vehicle seat 10 in fabrication thereof.

In the vehicle seat 10, the supporter 88 is provided in the recess 84 formed in the pad 22 of the seat back 12. In the attachment groove 90 formed in the supporter 88, the force-delivery plate 32, which constitutes a load detector 28, is arranged. Meanwhile, in the arrangement example of the force-delivery plate 32 in the different type of the recess 84, the force-delivery plate 32 is firmly fixed in the supporter 88 through an adhesive or inserted in the pocket 92. Namely, in both embodiments, the force-delivery plate 32 is basically structured to be held in the pad 22. Consequently, the force-delivery plate 32 can be arranged in a position opposed to the coupler 70 of the detector body 30 regardless of the structure of the spring system, etc., of the seat back 12.

Meanwhile, because a support (receiver) of the force-delivery plate 32 is formed by forming the pad 22 as mentioned in the above, there is no need to provide a support for the force-delivery plate 32 separately on the seat back 12. This eliminates the need of forming a support (receiver) for the force-delivery plate 32, thus reducing the fabrication cost.

Furthermore, when the vehicle seat 10 is constituted so that the force-delivery plate 32 is insert-formed upon forming the pad 22, the force-delivery plate 32 can be arranged in the pad 22 upon forming the pad 22, and thus, a step of attaching the force-delivery plate 32 is unnecessary, and accordingly, the step of attaching the force-delivery plate 32 can be eliminated. Therefore, fabrication cost can be reduced.

Meanwhile, in the vehicle seat 10, all the structural components of the detector body 30 are assembled along axial direction of the shaft 58 as explained in the above. Consequently, when assembling the detector body 30, the efficiency of assembly can be improved because there is no need of changing the direction of each structural component of the detector body 30. Moreover, where assembling the detector body 30 is mechanized, an assembly machine (e.g. robot) for fabrication the detector body can be simplified in the structure thereof since the components thereof can be assembled in a predetermined direction.

Furthermore, in the vehicle seat 10, the components of the slide unit 110 are arranged substantially along the rotary axis of the sector gears 142 and 144. Consequently, assembly of the slide unit 110 can be simplified in the same way as mentioned on the detector body 30.

2. Second Embodiment

Now a modification of the detector body 30 is described as a second embodiment. Incidentally, in the second embodiment, reference numerals that are identical with those in the first embodiment show the identical element.

Figure 13:
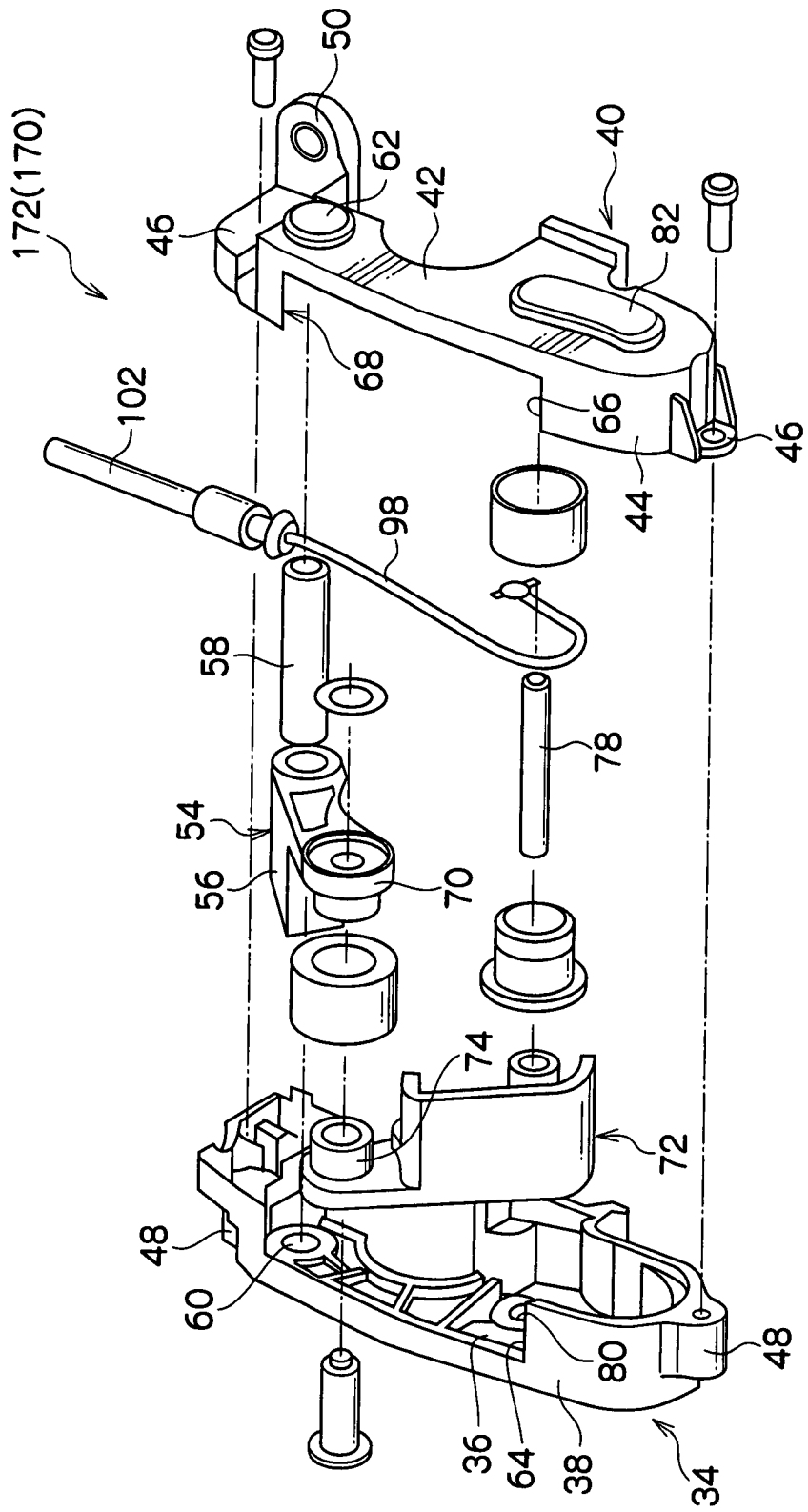
FIG. 13 is an exploded perspective view of a detector of a load detecting means of a vehicle seat according to a second embodiment.

FIG. 13 shows an exploded perspective view of a detector body 172 structure of a load detector 170 that corresponds to the load detecting means of the present invention and is a modification of the detector body 30 of the load detector 28. As shown in the figure, the detector body 172 has substantially identical structure with the detector body 30. However, in the detector body 30, one end of the cable 98 engages with the slide shaft 78 through the plate 100, on the other hand, in the detector body 172, the cable 98 is wrapped around the slide shaft 78, bent back, and fixed in the leftward housing 40 at a portion closer to the shaft 58 than the slide shaft 78.

Consequently, in the detector body 172, when the slide shaft 78 is guided along the guide grooves 80, 82, the cable 98 is changed in length at both sides of the section that is folded over the slide shaft 78 in accordance with a movement of the slide shaft 78. Namely, in the detector body 172, the cable 98 can be pulled in a length two times longer than a distance of the movement of the slide shaft 78.

What is claimed is:

1. A vehicle seat comprising:
  a seat body having a seat back, a pair of legs, a headrest coupled to the seat back at an upper side of the seat back via the pair of legs;
  a load detecting unit provided on the seat back and having a movable part that displaces in a predetermined direction upon being subjected to a load from a front of the seat back;
  a first interacting member mechanically coupled to one leg of the pair of legs and to the movable part of the load detecting unit, that moves the one leg of the pair of legs in conjunction with a displacement of the movable part caused upon being subjected to the load and thereby displacing the headrest toward the front; and
  a second interacting member mechanically coupled to the other leg of the pair of legs and to the first interacting member, that moves the other leg of the pair of legs in conjunction with a movement of the first interacting member caused upon moving the one leg of the pair of legs and thereby displacing the headrest toward the front,
  wherein at least one of the first and second interacting members comprises a pressure-contact member that is pressure-contacted with the legs or a coupler member that connects both legs.

2. A vehicle seat according to claim 1, wherein the first interacting member has a first gear that is rotated by a movement of the movable part so as to move the one leg of the pair of legs, and
  the second interacting member having a second gear that is in mesh with the first gear and rotates in conjunction with the rotation of the first gear to move the other leg of the pair of legs.

3. A vehicle seat according to claim 2, further comprising a first guide member that guides the legs at a forward side of the legs with respect to a front-rear direction of the seat body,
  a second guide member that guides the legs at a rearward side with respect to the front-rear direction and is coupled integrally with the first guide member and,
  a support including which at least one of the first and second guide members is assembled along the front-rear direction and including which the first and second interacting members are assembled along the front-rear direction.

4. A vehicle seat according to claim 3, wherein the pressure-contact member protrudes in a direction of a rotation axis from a position spaced from the rotation axis thereof.

5. A vehicle seat according to claim 2, wherein the pressure-contact member protrudes in a direction of a rotation axis from a position spaced from the rotation axis thereof.

6. A vehicle seat according to claim 5, further comprising a lower-end guide for displacing a vertically lower end of the legs rearward of the seat back in conjunction with an upward movement of the legs relative to the seat back, and
  a fulcrum point placed in contact against a vertically intermediate part of the legs above a contact point to incline forward of the seat back about the contact point with the legs due to a displacement of the lower end of the legs rearward of the seat back.

7. A vehicle seat according to claim 6, wherein the lower-end guide comprises
  a slider guide that is provided to incline such that the upper portion thereof with respect to a vertical of the seat body is positioned rearward relative to a lower portion, and having a guide surface formed in a planar form that continues from a lower end to an upper end of the slider guide, and
  a slider coupled to the lower ends of the legs to slide between lower and upper portions of the lower-end guide while being guided along the guide surface in a state of surface-contact with the guide surface.

8. A vehicle seat according to claim 2, further comprising
a lower-end guide for displacing a vertically lower end of the legs rearward of the seat back in conjunction with an upward movement of the legs relative to the seat back, and
a fulcrum point placed in contact against a vertically intermediate part of the legs above a contact point to incline forward of the seat back about the contact point with the legs due to a displacement of the lower end of the legs rearward of the seat back.

9. A vehicle seat according to claim 8, wherein the lower-end guide comprises
a slider guide that is provided to incline such that the upper portion thereof with respect to a vertical of the seat body is positioned rearward relative to a lower portion, and having a guide surface formed in a planar form that continues from a lower end to an upper end of the slider guide, and
a slider coupled to the lower ends of the legs to slide between lower and upper portions of the lower-end guide while being guided along the guide surface in a state of surface-contact with the guide surface.

10. A vehicle seat according to claim 2, further comprising a correction mechanism that absorbs a delay of the movement of the other leg of the pair of legs due to the rotation of the second gear relative behind the movement of the one leg of the pair of legs due to the rotation of the first gear, so that the pair of legs move simultaneously.

11. A vehicle seat according to claim 10, further comprising
a first guide member that guides the legs at a forward side of the legs with respect to a front-rear direction of the seat body,
a second guide member that guides the legs at a rearward side with respect to the front-rear direction and is coupled integrally with the first guide member and,
a support including which at least one of the first and second guide members is assembled along the front-rear direction and including which the first and second interacting members are assembled along the front-rear direction.

12. A vehicle seat according to claim 11, wherein the pressure-contact member protrudes in a direction of a rotation axis from a position spaced from the rotation axis thereof.

13. A vehicle seat according to claim 10, wherein the pressure-contact member protrudes in a direction of a rotation axis from a position spaced from the rotation axis thereof.

14. A vehicle seat according to claim 10, further comprising
a lower-end guide for displacing a vertically lower end of the legs rearward of the seat back in conjunction with an upward movement of the legs relative to the seat back, and
a fulcrum point placed in contact against a vertically intermediate part of the legs above a contact point to incline forward of the seat back about the contact point with the legs due to a displacement of the lower end of the legs rearward of the seat back.

15. A vehicle seat according to claim 14, wherein the lower-end guide comprises
a slider guide that is provided to incline such that the upper portion thereof with respect to a vertical of the seat body is positioned rearward relative to a lower portion, and having a guide surface formed in a planar form that continues from a lower end to an upper end of the slider guide, and
a slider coupled to the lower ends of the legs to slide between lower and upper portions of the lower-end guide while being guided along the guide surface in a state of surface-contact with the guide surface.

16. A vehicle seat according to claim 1, further comprising
a first guide member that guides the legs at a forward side of the legs with respect to a front-rear direction of the seat body,
a second guide member that guides the legs at a rearward side with respect to the front-rear direction and is coupled integrally with first guide member and,
a support including which at least one of the first and second guide members is assembled along the front-rear direction and including which the first and second interacting members are assembled along the front-rear direction.

17. A vehicle seat according to claim 16, further comprising
a lower-end guide for displacing a vertically lower end of the legs rearward of the seat back in conjunction with an upward movement of the legs relative to the seat back, and
a fulcrum point placed in contact against a vertically intermediate part of the legs above a contact point to incline forward of the seat back about the contact point with the legs due to a displacement of the lower end of the legs rearward of the seat back.

18. A vehicle seat according to claim 17, wherein the lower-end guide comprises
a slider guide that is provided to incline such that the upper portion thereof with respect to a vertical of the seat body is positioned rearward relative to a lower portion, and having a guide surface formed in a planar form that continues from a lower end to an upper end of the slider guide, and
a slider coupled to the lower ends of the legs to slide between lower and upper portions of the lower-end guide while being guided along the guide surface in a state of surface-contact with the guide surface.

19. A vehicle seat according to claim 1, further comprising
a lower-end guide for displacing a vertically lower end of the legs rearward of the seat back in conjunction with an upward movement of the legs relative to the seat back, and
a fulcrum point placed in contact against a vertically intermediate part of the legs above a contact point to incline forward of the seat back about the contact point with the legs due to a displacement of the lower end of the legs rearward of the seat back.

20. A vehicle seat according to claim 19, wherein the lower-end guide comprises
a slider guide that is provided to incline such that the upper portion thereof with respect to a vertical of the seat body is positioned rearward relative to a lower portion, and having a guide surface formed in a planar form that continues from a lower end to an upper end of the slider guide, and
a slider coupled to the lower ends of the lees to slide between lower and upper portions of the lower-end guide while being guided alone the guide surface in a state of surface-contact with the guide surface.

* * * * *

UNITED STATES PATENT AND TRADEMARK OFFICE
CERTIFICATE OF CORRECTION

PATENT NO. : 7,673,938 B2
APPLICATION NO. : 11/822665
DATED : March 9, 2010
INVENTOR(S) : Hiroyoshi Yamaguchi et al.

It is certified that error appears in the above-identified patent and that said Letters Patent is hereby corrected as shown below:

In claim 2, column 14, line 28, "first gear to move" should read --first gear so as to move--.

In claim 16, column 16, line 14, "with first guide" should read --with the first guide--.

In claim 20, column 16, line 61, "lees" should read --legs--.

In claim 20, column 16, line 63, "alone" should read --along--.

Signed and Sealed this

First Day of June, 2010

David J. Kappos
*Director of the United States Patent and Trademark Office*